United States Patent
Panchaksharaiah et al.

(10) Patent No.: US 12,244,910 B2
(45) Date of Patent: **\*Mar. 4, 2025**

(54) SYSTEMS AND METHODS FOR GENERATING SUMMARIES OF MISSED PORTIONS OF MEDIA ASSETS

(71) Applicant: Adeia Guides Inc., San Jose, CA (US)

(72) Inventors: Vishwas Sharadanagar Panchaksharaiah, Tumkur District (IN); Vikram Makam Gupta, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,478

(22) Filed: Dec. 12, 2022

(65) Prior Publication Data

US 2023/0114390 A1 Apr. 13, 2023
US 2023/0345091 A9 Oct. 26, 2023

Related U.S. Application Data

(63) Continuation of application No. 17/329,360, filed on May 25, 2021, now Pat. No. 11,570,528, which is a
(Continued)

(51) Int. Cl.
*H04N 21/8549* (2011.01)
*H04N 21/432* (2011.01)
(Continued)

(52) U.S. Cl.
CPC ....... *H04N 21/8549* (2013.01); *H04N 21/432* (2013.01); *H04N 21/44218* (2013.01);
(Continued)

(58) Field of Classification Search
CPC ............. H04N 21/8549; H04N 21/432; H04N 21/44218; H04N 21/84; H04N 21/8456
See application file for complete search history.

(56) References Cited

U.S. PATENT DOCUMENTS

| 6,154,771 A | 11/2000 | Rangan et al. |
| 6,239,794 B1 | 5/2001 | Yuen et al. |

(Continued)

FOREIGN PATENT DOCUMENTS

| WO | 2009066213 A1 | 5/2009 |
| WO | 2016057416 A1 | 4/2016 |

OTHER PUBLICATIONS

U.S. Appl. No. 16/204,507, filed Jan. 4, 2022, Aman Puniyani.
(Continued)

*Primary Examiner* — Joshua D Taylor
(74) *Attorney, Agent, or Firm* — Haley Guiliano LLP

(57) ABSTRACT

A media guidance application may determine a length of a portion of a media asset that the user has missed and compare the length with a threshold length. If the length is greater than the threshold length, the media guidance application may generate a first summary of the missed portion of the media asset based on segments of the missed portion of the media asset that are of a first importance. If the length is not greater than the threshold length, the media guidance application may generate a second summary of the missed portion of the media asset based on segments of the missed portion of the media asset that are of the first importance and the second importance. The media guidance application may generate for display the summary.

20 Claims, 6 Drawing Sheets

Related U.S. Application Data continuation of application No. 16/896,522, filed on Jun. 9, 2020, now Pat. No. 11,051,084, which is a continuation of application No. 15/696,743, filed on Sep. 6, 2017, now Pat. No. 10,715,883.

(51) Int. Cl.
*H04N 21/442* (2011.01)
*H04N 21/84* (2011.01)
*H04N 21/845* (2011.01)
*G06V 10/75* (2022.01)
*H04N 21/482* (2011.01)

(52) U.S. Cl.
CPC ......... *H04N 21/84* (2013.01); *H04N 21/8456* (2013.01); *G06V 10/75* (2022.01); *H04N 21/4821* (2013.01)

(56) References Cited

U.S. PATENT DOCUMENTS

| | | |
|---|---|---|
| 6,557,042 B1 | 4/2003 | He et al. |
| 6,564,378 B1 | 5/2003 | Satterfield et al. |
| 6,829,781 B1 | 12/2004 | Bhagavath et al. |
| 7,165,098 B1 | 1/2007 | Boyer et al. |
| 7,313,808 B1 | 12/2007 | Gupta et al. |
| 7,761,892 B2 | 7/2010 | Ellis et al. |
| 7,840,977 B2 | 11/2010 | Walker et al. |
| 8,046,801 B2 | 10/2011 | Ellis et al. |
| 8,230,343 B2 | 7/2012 | Logan et al. |
| 8,650,599 B2 | 2/2014 | Shindo et al. |
| 8,769,571 B2 | 7/2014 | De et al. |
| 9,094,738 B2 | 7/2015 | Kishore |
| 9,158,435 B2 | 10/2015 | Clark et al. |
| 9,286,938 B1 | 3/2016 | Tseytlin |
| 9,486,698 B2 | 11/2016 | Chung et al. |
| 9,743,119 B2 | 8/2017 | Todd |
| 10,182,271 B1 | 1/2019 | Sanchez et al. |
| 10,715,883 B2 | 7/2020 | Panchaksharaiah et al. |
| 10,721,377 B1 | 7/2020 | Wu et al. |
| 11,252,483 B2 | 2/2022 | Puniyani et al. |
| 11,778,286 B2 | 10/2023 | Puniyani et al. |
| 2002/0174430 A1 | 11/2002 | Ellis et al. |
| 2003/0154479 A1 | 8/2003 | Brenner et al. |
| 2004/0088723 A1 | 5/2004 | Ma et al. |
| 2004/0133569 A1 | 7/2004 | Munetsugu et al. |
| 2005/0028194 A1 | 2/2005 | Elenbaas et al. |
| 2005/0086703 A1 | 4/2005 | Gupta et al. |
| 2005/0097621 A1 | 5/2005 | Wallace et al. |
| 2005/0193425 A1 | 9/2005 | Sull et al. |
| 2005/0251827 A1 | 11/2005 | Ellis et al. |
| 2006/0064733 A1 | 3/2006 | Norton et al. |
| 2006/0106971 A1 | 5/2006 | Mahar et al. |
| 2006/0149781 A1 | 7/2006 | Blankinship |
| 2007/0101369 A1 | 5/2007 | Dolph |
| 2007/0168864 A1 | 7/2007 | Yamamoto et al. |
| 2007/0201558 A1 | 8/2007 | Xu et al. |
| 2008/0244683 A1 | 10/2008 | Matthews |
| 2009/0042607 A1 | 2/2009 | Adachi et al. |
| 2009/0235308 A1 | 9/2009 | Ehlers et al. |
| 2010/0153885 A1 | 6/2010 | Yates |
| 2010/0195975 A1 | 8/2010 | Issa et al. |
| 2011/0194839 A1 | 8/2011 | Gebert et al. |
| 2011/0293250 A1 | 12/2011 | Deever |
| 2012/0094768 A1 | 4/2012 | Mccaddon et al. |
| 2013/0251331 A1 | 9/2013 | Sambongi |
| 2013/0297706 A1 | 11/2013 | Arme et al. |
| 2014/0068661 A1 | 3/2014 | Gates et al. |
| 2014/0101707 A1 | 4/2014 | Kishore |
| 2014/0156651 A1 | 6/2014 | Rayter |
| 2014/0281982 A1 | 9/2014 | Clark et al. |
| 2014/0281989 A1 | 9/2014 | Clark et al. |
| 2014/0282759 A1 | 9/2014 | Harvey et al. |
| 2015/0023650 A1 | 1/2015 | Austin et al. |
| 2015/0058175 A1 | 2/2015 | Axt et al. |
| 2015/0082349 A1 | 3/2015 | Ishtiaq et al. |
| 2015/0143436 A1 | 5/2015 | Gibbon et al. |
| 2016/0014482 A1 | 1/2016 | Chen et al. |
| 2016/0057475 A1 | 2/2016 | Liu |
| 2016/0088352 A1 | 3/2016 | Agarwal et al. |
| 2016/0227282 A1 | 8/2016 | Chang et al. |
| 2016/0249116 A1 | 8/2016 | Harb |
| 2016/0261929 A1 | 9/2016 | Lee et al. |
| 2017/0064413 A1 | 3/2017 | Nayak et al. |
| 2017/0078447 A1 | 3/2017 | Hancock et al. |
| 2017/0109584 A1 | 4/2017 | Yao et al. |
| 2017/0134828 A1 | 5/2017 | Krishnamurthy et al. |
| 2017/0142481 A1 | 5/2017 | Caruana et al. |
| 2017/0182283 A1 | 6/2017 | Palmateer et al. |
| 2017/0223413 A1 | 8/2017 | Kozloski et al. |
| 2017/0230731 A1 | 8/2017 | Amento et al. |
| 2017/0257410 A1 | 9/2017 | Gattis et al. |
| 2017/0272818 A1 | 9/2017 | Gattis et al. |
| 2017/0332125 A1 | 11/2017 | Panchaksharaiah et al. |
| 2017/0374120 A1 | 12/2017 | Vishnia et al. |
| 2018/0008894 A1 | 1/2018 | Sack |
| 2018/0020243 A1 | 1/2018 | Ni et al. |
| 2018/0081618 A1 | 3/2018 | Mclean |
| 2018/0288460 A1 | 10/2018 | Thomas et al. |
| 2018/0349368 A1 | 12/2018 | Bellingham et al. |
| 2018/0367835 A1 | 12/2018 | Hamidi-Rad et al. |
| 2019/0035431 A1 | 1/2019 | Attorre et al. |
| 2019/0037278 A1 | 1/2019 | Ahonen et al. |
| 2019/0075374 A1 | 3/2019 | Panchaksharaiah et al. |
| 2019/0230387 A1 | 7/2019 | Gersten |
| 2019/0268674 A1 | 8/2019 | Spears |
| 2019/0273972 A1 | 9/2019 | Soderbergh et al. |
| 2019/0289359 A1 | 9/2019 | Sekar et al. |
| 2020/0045384 A1 | 2/2020 | Nilsson |
| 2020/0177971 A1 | 6/2020 | Puniyani et al. |
| 2020/0195983 A1 | 6/2020 | Chao |
| 2020/0304888 A1 | 9/2020 | Panchaksharaiah et al. |
| 2021/0029393 A1 | 1/2021 | Bermeister |
| 2021/0058672 A1 | 2/2021 | Young et al. |
| 2021/0281930 A1 | 9/2021 | Panchaksharaiah et al. |
| 2023/0421867 A1 | 12/2023 | Puniyani et al. |

OTHER PUBLICATIONS

PCT International Search Report and Written Opinion in Application No. PCT/US2018/049386, dated Nov. 6, 2018 (16 pages).

SYSTEMS AND METHODS FOR GENERATING SUMMARIES OF MISSED PORTIONS OF MEDIA ASSETS

CROSS-REFERENCE TO RELATED APPLICATIONS

This application is a continuation of U.S. patent application Ser. No. 17/329,360, filed May 25, 2021, which is a continuation of U.S. patent application Ser. No. 16/896,522, filed Jun. 9, 2020, now U.S. Pat. No. 11,051,084, which is a continuation of U.S. patent application Ser. No. 15/696,743, filed Sep. 6, 2017, now U.S. Pat. No. 10,715,883. The disclosures of which are hereby incorporated by reference herein in their entireties.

BACKGROUND

As the amount of content has increased users have less and less time to consume that content. Users sometimes miss portions of content for various reasons. For example, a user may go to his/her kitchen to make a sandwich while a football game is in progress or may need to run out to pick up a child from school while a baseball game is being broadcast. When a user has missed a portion of content, it may be useful to create a short summary for the missed content so that the user can continue consuming the content with minimal interruption while also being aware of what he/she has missed. Various systems are currently available that generate summaries or highlights of media content. For example, one system can generate a summary of a media asset from specific segments. Another system can generate a summary of a media asset so that summary can be received by a target system within a specific amount of time and based on a specific network speed.

SUMMARY

However, conventional systems are not concerned with how much content the user has missed. Therefore, systems and methods are described herein for generating a summary of a missed portion of a media asset based on an amount of the media asset that the user has missed. For example, if a user missed a short portion of a media asset (e.g., five percent, ten minutes, or another suitable portion) that the user has been consuming, the user may want a very detailed summary because the user will not want to miss a lot of content. However, if the user missed a long portion of the media asset (e.g., fifty percent, one hour or another suitable portion), the user may want a much less detailed summary (e.g., only highlights) because it will take too long to review a detailed summary.

A media guidance application may be used to execute actions for generating a summary of a missed portion of a media asset based on an amount of the media asset that the user has missed. The media guidance application may determine a length of a portion of a media asset that the user has missed and compare the length with a threshold length. If the length is greater than the threshold length, the media guidance application may generate a first summary of the missed portion of the media asset based on segments of the missed portion of the media asset that are of a first importance. If the length is not greater than the threshold length, the media guidance application may generate a second summary of the missed portion of the media asset based on segments of the missed portion of the media asset that are of the first importance and the second importance. The media guidance application may generate for display the summary.

In some aspects, the media guidance application may perform the following actions when generating summaries for missed portions of media assets. The media guidance application may retrieve a start time and a stop time of a portion of a media asset that a user has missed. For example, the media guidance application may be monitoring user interactions and when a user switches to a different media source (e.g., a different channel), the media guidance application may store (e.g., in a user's profile) an identifier for the media asset that the user has been consuming and a time within the media asset when the user has switched to a different content source. The media guidance application may retrieve that information when determining whether to generate a summary. For example, if the user switched back to the original content source, the media guidance application may retrieve the time when the user switched away from the content source (e.g., the start time) and retrieve the current time within the media asset (i.e., the stop time).

The media guidance application may determine, based on the start time and the stop time, a length of the portion of the media asset that the user has missed. For example, the media guidance application may subtract the start time (e.g., the time within the media asset when the user started consuming the media asset again) from the stop time (e.g., the time within the media asset when the user stopped consuming the media asset).

The media guidance application may obtain identifiers of summary segments for the media asset so that some of the summary segments may be used in the summary. Specifically, the media guidance application may transmit a request that includes an instruction for receiving segment data for media asset summary segments that are associated with the media asset. For example, if the user is watching "Terminator," the media guidance application may generate a request (e.g., to a database server) for summary segments for "Terminator" and include in the request a media asset identifier associated with the "Terminator."

The media guidance application may receive in response to the request, information related to the summary segments. That information may include identifiers for the segments, location of the segments, start time and stop time for the segments, and other suitable information. Specifically, the media guidance application may receive in response to the request, the segment data for the media asset summary segments that are associated with the media asset. For example, the media guidance application may receive a response (e.g., from a database server) that include identifying information for the summary segments for "Terminator."

The media guidance application may compare the length of the portion of the media asset that the user has missed with a threshold length corresponding to a threshold time interval for creating different versions of the summary. Specifically, the media guidance application may compare the length with a threshold length. For example, if the user has missed ten minutes of the "Terminator" and the threshold length is fifteen minutes, the media guidance application may determine that the threshold has not been reached. It should be noted that the threshold may be stored as a time length, a percentage (e.g., twenty percent) of the media asset, a fraction (e.g., one fifth) of the media asset, or another suitable parameter.

If the media guidance application determines that the length of the missed portion is greater than the threshold length, the media guidance application may generate a summary using segments of a first importance (e.g., the most important segments). Specifically, the media guidance application may, in response to determining that the length is greater than the threshold length, retrieve, from the segment data, a first plurality of segment identifiers for media asset summary segments of a first importance. For example, the media guidance application may determine that the user missed ten minutes of the "Terminator" while the threshold length is fifteen minutes. In response, the media guidance application may select segment identifiers corresponding to only the most important summary segments (e.g., where importance score is set to a highest number).

If the media guidance application determines that the length of the missed portion is not greater than the threshold length, the media guidance application may generate a summary using segments of a first importance and a second importance (e.g., the most important segments and less important segments). Specifically, the media guidance application may, in response to determining that the length is not greater than the threshold length, retrieve, from the segment data, a second plurality of segment identifiers for media asset summary segments of one of the first importance and a second importance. For example, the media guidance application may determine that the user missed fifty minutes of the "Terminator" while the threshold length is fifteen minutes. In response, the media guidance application may select both segment identifiers corresponding to the most important summary segments and identifiers for summary segments that are less important (e.g., where importance score is set to a highest number and also where the importance score is set to a second highest number).

The media guidance application may generate a summary using either the segments of the first importance or both the segments of the first importance and the second importance. Specifically, the media guidance application may generate a summary of the missed portion of the media asset based on one of the first plurality of segment identifiers and the second plurality of segment identifiers. For example, the media guidance application may generate a summary for a missed portion of "Terminator" using the most important segments (e.g., highlights) or also include some segments that are not as important (e.g., more pieces of the storyline).

The media guidance application may generate for display the summary. For example, the media guidance application may access the segments for the summary (e.g., from local storage or a remote server) using the segment information (e.g., the summary may include a plurality of segment identifiers) and play the segments based on the segment identifiers in a chronological order. In some embodiments, the media guidance application may generate from the segment identifiers an audio-visual file that is the summary.

In some embodiments, the media guidance application may retrieve, from the segment data, the first plurality of segment identifiers corresponding to media asset summary segments of the first importance using the following actions. The media guidance application may compare, for each summary segment within the segment data, a field that identifies an importance associated with the respective summary segment with a value representing a highest importance. For example, the media guidance application may determine the highest importance value based on the information in the segment data (e.g., a value of five). The media guidance application may iterate through each segment within the segment data and compare that value (e.g., five) with an importance field of the segment.

The media guidance application may identify the segments with the highest importance value, based on the comparing and create a data structure (e.g., a set) to store the information about those segments. Specifically, the media guidance application may generate, based on comparing, for each summary segment within the segment data, the field that identifies the importance associated with the respective summary segment with the value representing the highest importance, a set of segment identifies associated with the highest importance. To continue with the example above, if the highest importance value is five, the media guidance application may generate a set of identifiers for summary segments that have an importance of five. The media guidance application may retrieve the set of segment identifiers as the first plurality of segment identifiers.

In some embodiments, the media guidance application may generate the summary of the missed portion of the media asset based on the first plurality of segment identifiers using the actions below. The media guidance application may retrieve, for each segment identifier in the set, a link corresponding to a location of the segment. For example, the segment data may be stored as a data structure that stores various information about all summary segments for the media asset (e.g., start time, stop time, link to segment, segment identifier, and other suitable information). The media guidance application may locate an entry associated with a specific summary segment and retrieve a link to the location of the segment. The media guidance application may repeat the process for each segment identifier in the set (i.e., for each segment to be included in the summary).

The media guidance application may use the retrieved links to retrieve the corresponding segments and combine the segments into a summary. Specifically, the media guidance application may retrieve, using a respective link, each segment associated with the set of segment identifiers, and generate the summary by combining the retrieved segments in chronological order. For example, the media guidance application may have determined that five different summary segments are to be included in the summary. The media guidance application may retrieve the links to the segments, and follow the links (e.g., transmit requests via the links) for the segments. The media guidance application may receive the segments and combine (e.g., create a clip) them to create the summary.

The media guidance application may generate the summary of the missed portion of the media asset based on the first plurality of segment identifiers by taking the following actions. The media guidance application may retrieve, for each segment identifier in the first plurality of segment identifiers, one or more start times and stop times each pair of a start time and a stop time corresponding to a segment. For example, the media guidance application may store a start time and a stop time for every segment. The media guidance application may retrieve that information.

The media guidance application may use the start and stop times to retrieve the appropriate segments. Specifically, the media guidance application may retrieve, from the media asset using the one or more start times and stop times, a plurality of segments for the summary. For example, if the summary is to include five different segments and those segments are pieces of the media asset, the media guidance application may scan the media asset for each start time and stop time and extract those portions from the media asset.

The media guidance application may generate the summary by combining the plurality of segments in chronological order. For example, the media guidance application may stitch the segments together into one clip that may be used as a summary.

In some embodiments, the media guidance application may generate the summary of the missed portion of the media asset based on the first plurality of segment identifiers using the following actions. The media guidance application may retrieve, for each segment identifier in the first plurality of segment identifiers, one or more start times and stop times each pair of start time and stop time corresponding to a segment. For example, if the summary is to include five different segments and those segments are pieces of the media asset, the media guidance application may scan the media asset for each start time and stop time and extract those portions from the media asset.

The media guidance application may store both the missed portion of the media asset and the one or more start times and stop times. For example, the media guidance application may store the missed portion of the media asset and the start and stop times as the summary. It should be noted that in some embodiments, the media guidance application may refrain from storing the missed portion of the media asset, but instead store just the start times and the stop times as the summary. Thus, when playing back the summary, the media guidance application may, on the fly, access the media asset (e.g., if it is stored for consumption on demand or otherwise at a server) and extract the appropriate segments corresponding to the start times and stop times.

In some embodiments, the media guidance application may generate for display the summary by taking the following actions. The media guidance application may retrieve the one or more start times and stop times in chronological order. For example, the media guidance application may store the summary as a plurality of start times and stop times such that the start times and stop times are times within the media asset. If the summary has five segments with start times and stop times of 10:30-10:45, 12:30-12:45, 14:40-14:45 and 16:45-17:00, the media guidance application may be storing that information instead of the segments themselves. The media guidance application may play portions of the missed portion of the media asset in accordance with the one or more start times and stop times. For example, the media guidance application may retrieve from the stored media asset the five segments and play them in chronological order.

In some embodiments, the media guidance application may determine the threshold length for generating different summaries based on the length of the media asset. For example, the media guidance application may retrieve the length of the media asset. For example, the media guidance application may retrieve the length of the media asset from metadata associated with the media asset or may analyze a digital file associated with the media asset to determine the length. The media guidance application may determine the threshold length based on the length of the media asset. For example, the media guidance application may be configured to set the threshold length to a length equal to fifty percent of the media asset or twenty-five percent of the media asset. Another suitable percentage or portion of the media asset may also be the threshold length.

In some embodiments the media guidance application may retrieve, from the segment data, the second plurality of segment identifiers for media asset summary segments of one of the first importance and the second importance by taking the following actions. The media guidance application may retrieve the first plurality of segment identifiers. For example, the media guidance application may retrieve segment identifiers for five segments to be used in generating the summary.

The media guidance application may identify other segments that are related to at least one of the segments of the first importance (e.g., the five segments described above). Specifically, the media guidance application may generate for each segment identifier in the first plurality of segment identifiers a set of other segment identifiers that are related to a respective segment. For example, each segment may be configured with a field (e.g., retrieved within the segment data) named "related segments." The media guidance application may use that field to determine segments related to the segments of first importance. The media guidance application may select one or more segment identifiers from each set of other segment identifiers to be included in the second plurality of segment identifiers. For example, the media guidance application may select one related segment to be included in the summary for each segment of the first importance.

In some embodiments, the media guidance application may iterate through each segment in the segment data and retrieve segment identifiers of segments that are associated with a second importance so that segments associated with those identifiers are included in the summary.

In some embodiments, the media guidance application may generate a data structure for the received segment data. Thus, the media guidance application may receive, in response to the request, the segment data for the media asset summary segments that are associated with the media asset using the following actions. The media guidance application may determine a plurality of fields associated with the segment data. For example, the segment data may include, for each segment, a segment identifier, start time, stop time, link to where the segment resides, and other suitable fields. The media guidance application may generate a data structure for the segment data, where the data structure includes a field for each field in the plurality of fields. For example, the data structure may include one of an XML file, a database entry, a database table, a multi-dimensional array in memory, or another suitable data structure. The media guidance application may store each field of the segment data in a corresponding field of the data structure.

In some embodiments, the media guidance application may generate a different summary for a media asset that is part of a series of media assets. The summary may include segments from a previous episode that are related to the segments of the current media asset that have been already selected from the summary. Specifically, the media guidance application may determine that the media asset is part of a series of media assets, and determine that the user has missed at least a portion of a previous episode of the series of media assets. For example, the user may be consuming an episode of the show "The Game of Thrones," which is part of a specific season of the show. The media guidance application may access the user's profile to determine whether the user missed a portion of the previous episode.

In response to determining that the user has missed at least a portion of the previous episode of the series of media assets, the media guidance application may retrieve a data structure that stores summary segments for the previous episode of the series, and select, from the data structure, segment identifiers that are related to summary segments of the first media asset that were selected for the summary. For example, the media guidance application may have determined that the user has missed a portion of the media asset that is about a specific story line within the series (e.g., a story line about a specific character). The media guidance application may identify segments of the same story line in the previous episode and add them to the summary. Thus, the media guidance application may add, to the summary, the selected summary segments.

It should be noted that the summary segments may be segments that are extracted from the specific portions of the media asset. In addition, summary segments may be segments that have been specifically created for the purpose of being included in the summary. These segments may be outtakes of different frames/portions of the media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
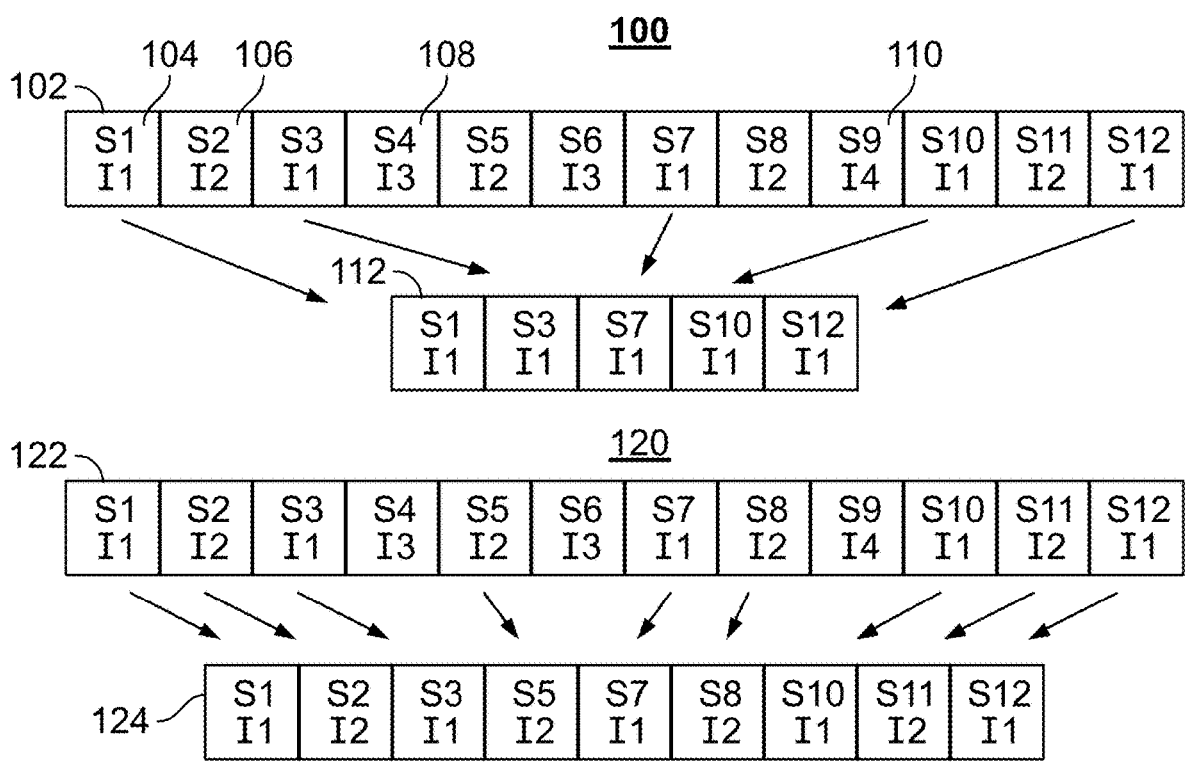
FIG. 1 shows an illustrative example of data structures that may be used for generating summaries for missed portions of media assets in accordance with some embodiments of the disclosure.

Systems and methods are described herein for generating a summary of a missed portion of a media asset based on an amount of the media asset that the user has missed. For example, if a user missed a short portion of a media asset (e.g., five percent, ten minutes, or another suitable portion) that the user has been consuming, the user may want a very detailed summary because the user will not want to miss a lot of content. However, if the user missed a long portion of the media asset (e.g., fifty percent, one hour or another suitable portion), the user may want a much less detailed summary (e.g., only highlights) because it will take too long to review a detailed summary.

The media guidance application may determine a length of a portion of a media asset that the user has missed and compare the length with a threshold length. If the length is greater than the threshold length, the media guidance application may generate a first summary of the missed portion of the media asset based on segments of the missed portion of the media asset that are of a first importance. If the length is not greater than the threshold length, the media guidance application may generate a second summary of the missed portion of the media asset based on segments of the missed portion of the media asset that are of the first importance and the second importance. The media guidance application may generate for display the summary.

In some embodiments, the media guidance application may perform the following actions when generating summaries for missed portions of media assets. The media guidance application may retrieve a start time and a stop time of a portion of a media asset that a user has missed. For example, the media guidance application may be monitoring user interactions and when a user switches to a different media source (e.g., a different channel), the media guidance application may store (e.g., in a user's profile) an identifier for the media asset that the user has been consuming and a time within the media asset when the user has switched to a different content source. The user profile may include a section that stores a listing of media assets that the user has partially consumed (e.g., media assets where a user missed a portion). The profile may store a media asset identifier for each media asset together with time intervals within those media assets corresponding to the missed portions. The media guidance application may retrieve those time intervals for generating a summary. The media guidance application may use various triggers to determine that a user has missed a portion of a media asset. Those triggers may include switching to a content source (e.g., channel, coming back to an on-demand media asset, power on the user's device, starting interactions with the user's device, or another suitable trigger).

The media guidance application may determine, based on the start time and the stop time, a length of the portion of the media asset that the user has missed. For example, the media guidance application may execute a time subtraction algorithm that takes as input the start time and the stop time and subtracts the start time (e.g., the time within the media asset when the user started consuming the media asset again) from the stop time (e.g., the time within the media asset when the user stopped consuming the media asset).

The media guidance application may obtain identifiers of summary segments for the media asset so that some of the summary segments may be used in the summary. Specifically, the media guidance application may transmit a request that includes an instruction for receiving segment data for media asset summary segments that are associated with the media asset. For example, the media guidance application may generate a request (e.g., to a database server) for summary segments and include in the request a media asset identifier associated with the media asset. The identifier may be a title of the media asset together with release date, a unique alpha-numeric number, or another suitable identifier.

The media guidance application may receive in response to the request, information related to the summary segments. That information may include identifiers for the segments, location of the segments, start time and stop time for the segments, and other suitable information. Specifically, the media guidance application may receive in response to the request, the segment data for the media asset summary segments that are associated with the media asset. FIG. 1 shows an illustrative example of segment data that the media guidance application may receive. Data 102 may represent segment data received for segments S1 to S12. Each segment may include importance I1 to I4. Segments 104 may be associated with importance I1 (e.g., the highest importance). Segments 106 may be associated with importance I2 (e.g., the second highest importance). Segments 108 may be associated with importance I3 (e.g., the third highest importance), and segments 110 may be associated with importance I4 (e.g., the fourth highest importance). Other segments with other importance designators may be included in the data structure. In some embodiments, the data structure may include a legend that informs the media guidance application the order of importance. It should be noted that this data structure may include other fields (e.g., links to the segments themselves, start and stop times of the segments, and other suitable fields).

The media guidance application may compare the length of the portion of the media asset that the user has missed with a threshold length corresponding to a threshold time interval for creating different versions of the summary. Specifically, the media guidance application may compare the length with a threshold length. For example, the media guidance application may retrieve a predefined value provided by a user or a service provider. In some embodiments, the media guidance application may calculate the threshold length based on the length of the media asset.

If the media guidance application determines that the length of the missed portion is greater than the threshold length, the media guidance application may generate a summary using segments of a first importance (e.g., the most important segments). Specifically, the media guidance application may, in response to determining that the length is greater than the threshold length, retrieve, from the segment data, a first plurality of segment identifiers for media asset summary segments of a first importance. For example, FIG. 1 illustrates selection of the first plurality of segment identifiers. As described above, data structure 102 represents segment data retrieved for the media asset. Data structure 112 represents selection of identifiers for summary segments of a first importance (i.e., importance of I1).

If the media guidance application determines that the length of the missed portion is not greater than the threshold length, the media guidance application may generate a summary using segments of a first importance and a second importance (e.g., the most important segments and less important segments). Specifically, the media guidance application may, in response to determining that the length is not greater than the threshold length, retrieve, from the segment data, a second plurality of segment identifiers for media asset summary segments of one of the first importance and a second importance. For example, FIG. 1 illustrates selection of segments I1 (e.g., highest importance) and I2 (e.g., second highest importance). Data structure 120 may represent the same data structure 100, but illustrates the selection of summary segments of importance I1 and I2. Data structure 124 represents identifiers of summary segments of importance I1 and I2.

The media guidance application may generate a summary using either the segments of the first importance or both the segments of the first importance and the second importance. Specifically, the media guidance application may generate a summary of the missed portion of the media asset based on one of the first plurality of segment identifiers and the second plurality of segment identifiers. For example, the media guidance application may iterate through either data structure 112 or data structure 124 and retrieve the summary segments associated with the selected segment identifiers.

The media guidance application may generate for display the summary. For example, the media guidance application may access the segments for the summary (e.g., from local storage or a remote server) using the segment information (e.g., the summary may include a plurality of segment identifiers) and play the segments based on the segment identifiers in a chronological order. In some embodiments, the media guidance application may generate from the segment identifiers an audio-visual file that is the summary.

In some embodiments, the media guidance application may retrieve, from the segment data, the first plurality of segment identifiers corresponding to media asset summary segments of the first importance using the following actions. The media guidance application may compare, for each summary segment within the segment data, a field that identifies an importance associated with the respective summary segment with a value representing a highest importance. For example, the media guidance application may determine the highest importance value based on the information in the segment data. As illustrated by FIG. 1 the media guidance application may determine that summary segments have an importance of I1, I2, I3, or I4. The media guidance application may need a legend to determine the relative ranks of the different importance scores. The media guidance application may iterate through each segment within the segment data and compare that value (e.g., I1) with an importance field of the segment.

The media guidance application may identify the segments with the highest importance value, based on the comparing and create a data structure (e.g., a set) to store the information about those segments. Specifically, the media guidance application may generate, based on comparing, for each summary segment within the segment data, the field that identifies the importance associated with the respective summary segment with the value representing the highest importance, a set of segment identifies associated with the highest importance. To continue with the example above, if the highest importance value is I1, the media guidance application may generate a set of identifiers for summary segments that have an importance of I1 (e.g., set represented by data structure 112). The media guidance application may retrieve the set of segment identifiers as the first plurality of segment identifiers.

In some embodiments, the media guidance application may generate the summary of the missed portion of the media asset based on the first plurality of segment identifiers using the actions below. The media guidance application may retrieve, for each segment identifier in the set, a link corresponding to a location of the segment. For example, the segment data may be stored as a data structure (e.g., data structure 100 or data structure 120). In addition to the illustrated fields of the data structure (e.g., identifier field and an importance field) data structure 100 or 120 may store various other fields related to the summary segments for the media asset (e.g., start time, stop time, link to segment, segment identifier, and other suitable information). The media guidance application may locate an entry associated with a specific summary segment and retrieve a link to the location of the segment. For example, the link may be an internet resource locator link for the corresponding summary segment. The media guidance application may repeat the process for each segment identifier in the set (i.e., for each segment to be included in the summary).

The media guidance application may use the retrieved links to retrieve the corresponding segments and combine the segments into a summary. Specifically, the media guidance application may retrieve, using a respective link, each segment associated with the set of segment identifiers, and generate the summary by combining the retrieved segments in chronological order. For example, the media guidance application may transmit a request to the address in the link for the corresponding summary segment. The media guidance application may receive the segments and combine (e.g., create a clip) them to create the summary.

The media guidance application may generate the summary of the missed portion of the media asset based on the first plurality of segment identifiers by taking the following actions. The media guidance application may retrieve, for each segment identifier in the first plurality of segment identifiers, one or more start times and stop times each pair of a start time and a stop time corresponding to a segment. For example, the media guidance application may store a start time and a stop time for every segment. The media guidance application may retrieve that information.

The media guidance application may use the start and stop times to retrieve the appropriate segments. Specifically, the media guidance application may retrieve, from the media asset, using the one or more start times and stop times, a plurality of segments for the summary. For example, the media guidance application may scan through the media asset and when the time within the media asset matches a first start time, the media guidance application may start extracting the portion of the media asset (e.g., video data and audio data) from the media asset until a first stop time is reached. When the first stop time is reached, the media guidance application may stop extracting the portion of the media asset and may store the retrieved data in memory. The media guidance application may repeat the process for each start time and stop time that is stored for the plurality of summary segments selected for the summary The media guidance application may generate the summary by combining the plurality of segments in chronological order. For example, the media guidance application may stitch the segments together into one clip that may be used as a summary. In addition, the media guidance application may store the combined media asset.

In some embodiments, the media guidance application may generate the summary of the missed portion of the media asset based on the first plurality of segment identifiers using the following actions. The media guidance application may retrieve, for each segment identifier in the first plurality of segment identifiers, one or more start times and stop times each pair of start time and stop time corresponding to a segment. As described above, the media guidance application may scan the media asset for each start time and stop time and extract those portions from the media asset.

The media guidance application may store both the missed portion of the media asset and the one or more start times and stop times. For example, the media guidance application may store the missed portion of the media asset and the start and stop times as the summary. It should be noted that in some embodiments, the media guidance application may refrain from storing the missed portion of the media asset, but instead store just the start times and the stop times as the summary. Thus, when playing back the summary, the media guidance application may, on the fly, access the media asset (e.g., if it is stored for consumption on demand or otherwise at a server) and extract the appropriate segments corresponding to the start times and stop times. Furthermore, the media guidance application may store the whole missed portion so that the user may consume the missed portion at a later time.

In some embodiments, the media guidance application may generate for display the summary by taking the following actions. The media guidance application may retrieve the one or more start times and stop times in chronological order. For example, the media guidance application may iterate through data structure 100 or data structure 120 and retrieve the start time and an end time for each segment. The media guidance application may access the media asset or the missed portion of the media asset and play portions of the missed portion of the media asset in accordance with each start time and stop time.

In some embodiments, the media guidance application may determine the threshold length for generating different summaries based on the length of the media asset. For example, the media guidance application may retrieve the length of the media asset. For example, the media guidance application may access metadata associated with the media asset and retrieve the length of the media asset from the metadata. In some embodiments, the media guidance application may analyze a digital file associated with the media asset to determine the length. The media guidance application may determine the threshold length based on the length of the media asset. For example, the media guidance application may be configured to set the threshold length to a length equal to fifty percent of the media asset or twenty-five percent of the media asset. Another suitable percentage or portion of the media asset may also be the threshold length.

In some embodiments the media guidance application may retrieve, from the segment data, the second plurality of segment identifiers for media asset summary segments of one of the first importance and the second importance by taking the following actions. The media guidance application may retrieve the first plurality of segment identifiers. For example, the media guidance application may retrieve segment identifiers for five segments to be used in generating the summary.

The media guidance application may identify other segments that are related to at least one of the segments of the first importance (e.g., the five segments described above). Specifically, the media guidance application may generate for each segment identifier in the first plurality of segment identifiers a set of other segment identifiers that are related to a respective segment. For example, each segment within segment data (e.g., segment data 100 or segment data 120) may be configured with a field named "related segments." The media guidance application may use that field to determine segments related to the segments of first importance. For example, the media guidance application may iterate through the field to determine all related segments for each summary segment selected for the summary. The media guidance application may select one or more segment identifiers from each set of other segment identifiers to be included in the second plurality of segment identifiers. For example, the media guidance application may select one related segment to be included in the summary for each segment of the first importance.

In some embodiments, the media guidance application may iterate through each segment in the segment data and retrieve segment identifiers of segments that are associated with a second importance so that segments associated with those identifiers are included in the summary.

In some embodiments, the media guidance application may generate a data structure for the received segment data. Thus, the media guidance application may receive, in response to the request, the segment data for the media asset summary segments that are associated with the media asset using the following actions. The media guidance application may determine a plurality of fields associated with the segment data. For example, the segment data may include, for each segment, a segment identifier, start time, stop time, link to where the segment resides, and other suitable fields. The media guidance application may generate a data structure for the segment data, where the data structure includes a field for each field in the plurality of fields. For example, the data structure may include one of an XML file, a database entry, a database table, a multi-dimensional array in memory, or another suitable data structure. The media guidance application may store each field of the segment data in a corresponding field of the data structure.

In some embodiments, the media guidance application may generate a different summary for a media asset that is part of a series of media assets. The summary may include segments from a previous episode that are related to the segments of the current media asset that have been already selected from the summary. Specifically, the media guidance application may determine that the media asset is part of a series of media assets, and determine that the user has missed at least a portion of a previous episode of the series of media assets. For example the media guidance application may access metadata associated with the media asset to determine whether it is part of a series of media assets. The metadata may also include a position of the media asset in the series (e.g., season number and episode number associated with the media asset). Based on the position, the media guidance application may identify a previous episode of the series. The media guidance application may access the user's profile to determine whether the previous episode's identifier is stored in the user's profile as a partially consumed media asset together with one or more start times and stop times indicating any missed portions of the media asset.

In response to determining that the user has missed at least a portion of the previous episode of the series of media assets, the media guidance application may retrieve a data structure that stores summary segments for the previous episode of the series, and select, from the data structure, segment identifiers that are related to summary segments of the first media asset that were selected for the summary. For example, the media guidance application may have determined that the user has missed a portion of the media asset that is about a specific story line within the series (e.g., a story line about a specific character). The media guidance application may identify segments of the same story line in the previous episode and add them to the summary. The media guidance application may make the identification by iterating through each summary segment already selected for the summary and determining related segments. It should be noted that in order for the identification to occur each summary segment needs to have a related segment field identifying related segments of other media asset (e.g., other episodes of the same series).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
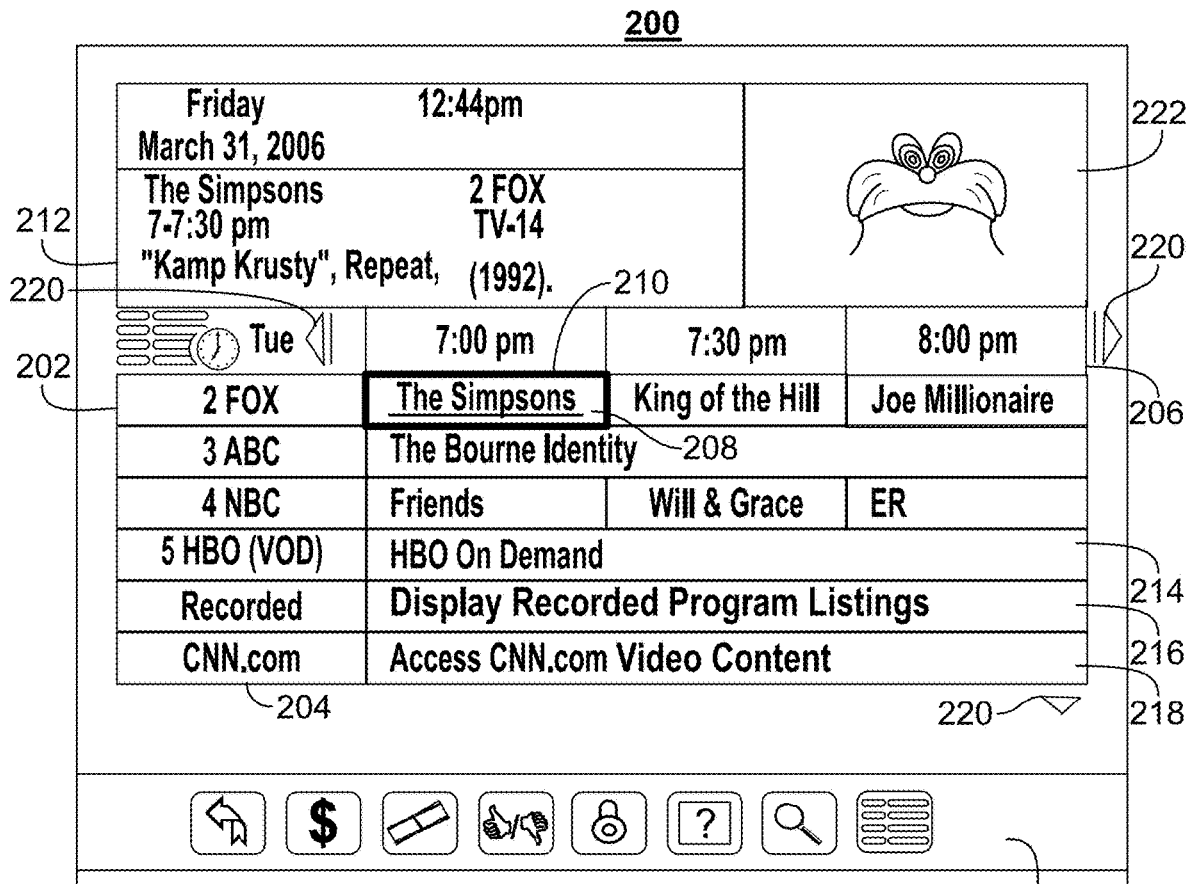
FIG. 2 shows an illustrative example of a display screen for use in accessing media content in accordance with some embodiments of the disclosure.
Figure 3:
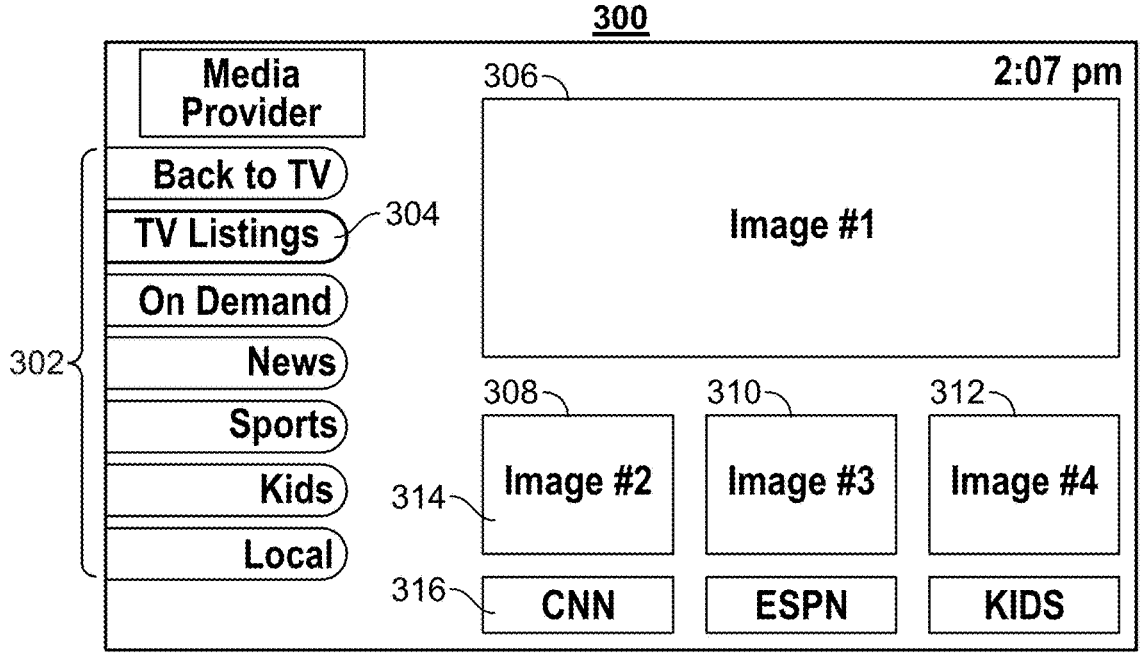
FIG. 3 shows another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
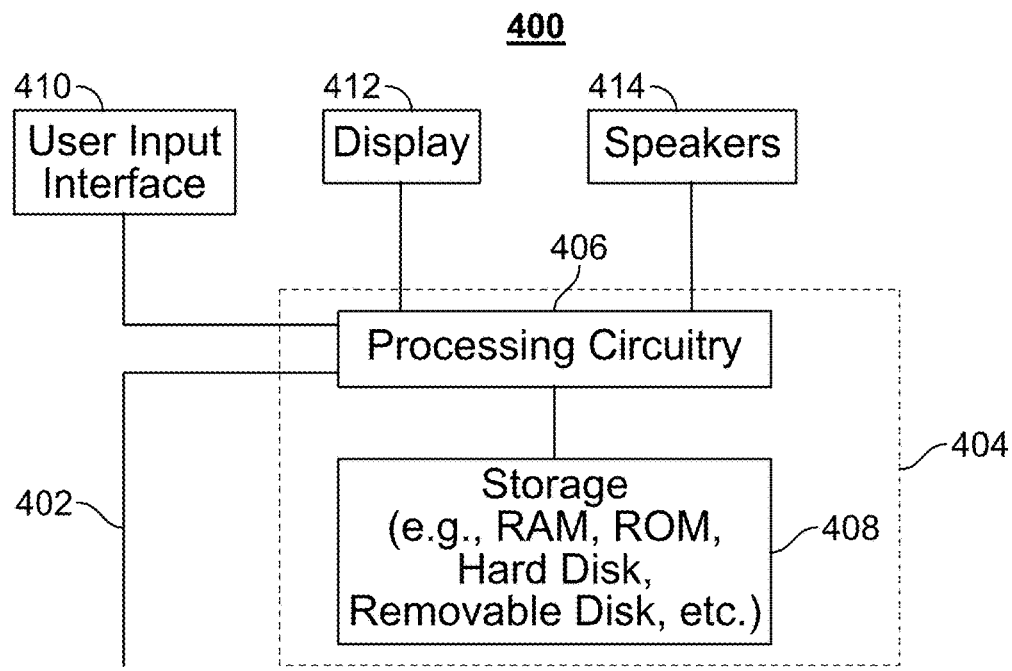
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays.

For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
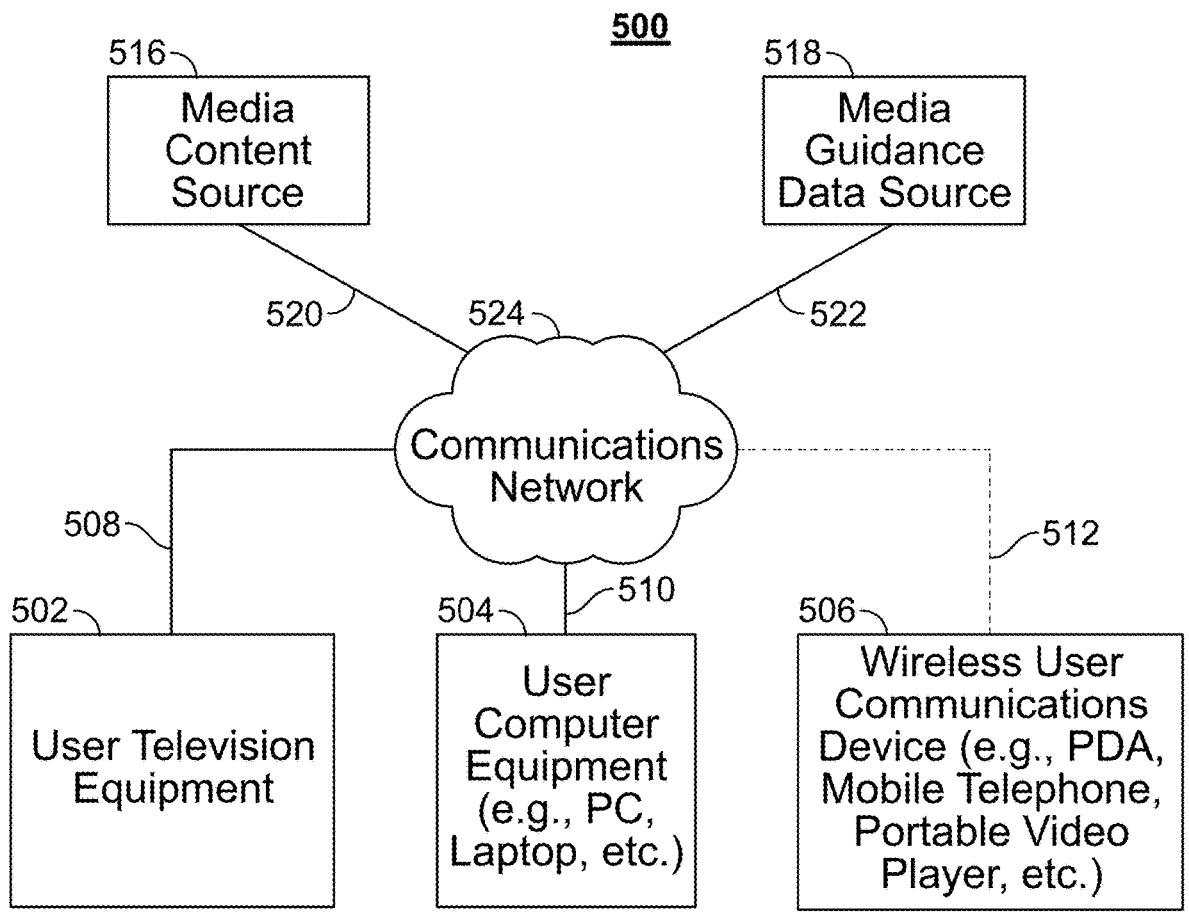
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
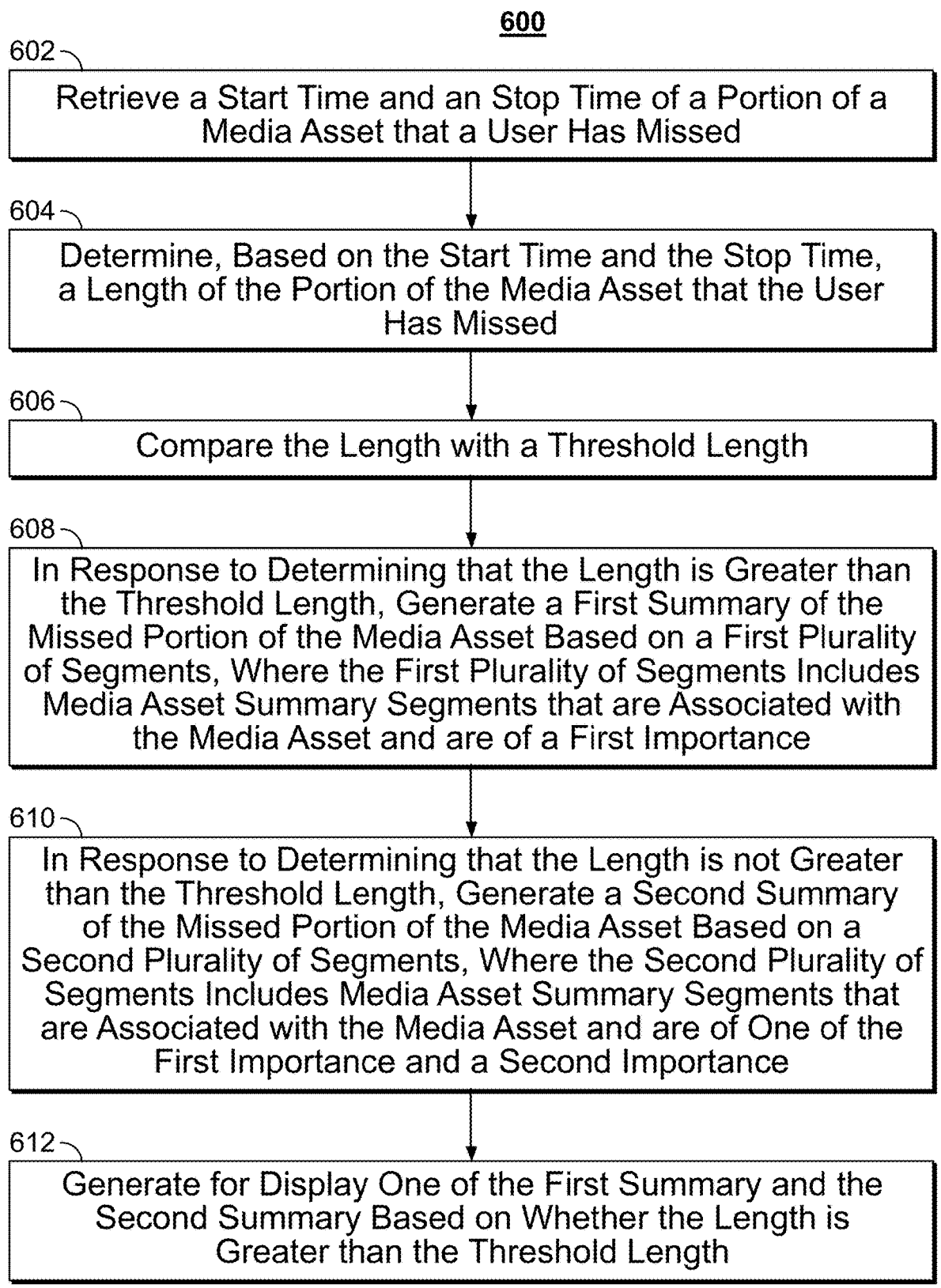
FIG. 6 is a flowchart of illustrative actions for generating summaries for missed portions of media assets in accordance with some embodiments of the disclosure.

FIG. 6 is a flowchart of illustrative actions for generating summaries for missed portions of media assets in accordance with some embodiments of the disclosure. At 602, control circuitry 404 retrieves a start time and a stop time of a portion of a media asset that a user has missed. The control circuitry may retrieve the start time and the stop time from storage 408. In some embodiments, the control circuitry may retrieve the start time and the stop time from a remote server (e.g., a server associated with media content source 516 and/or media guidance data source 518).

At 604, control circuitry 404 determines, based on the start time and the stop time, a length of the portion of the media asset that the user has missed. For example, the control circuitry may perform a time subtraction operation, subtracting the start time from the stop time.

At 606, control circuitry 404 compares the length with a threshold length. The control circuitry may retrieve the two values of memory and execute a comparison operation. If the two values are numeric, the control circuitry may execute a numeric comparison operation. If the two values are alpha-numeric, the control circuitry may perform a text comparison operation.

At 608, control circuitry 404, in response to determining that the length is greater than the threshold length, generates a first summary of the missed portion of the media asset based on a first plurality of segments, where the first plurality of segments includes media asset summary segments that are associated with the media asset and are of a first importance. The control circuitry may, upon determining that the length is greater than the threshold value retrieve (e.g., from storage 404) summary segments of the first importance. In some embodiments, the control circuitry may retrieve the summary segments from a remote server (e.g., a server associated with media content source 516 and/or media guidance data source 518).

At 610, control circuitry 404, in response to determining that the length is not greater than the threshold length, generates a second summary of the missed portion of the media asset based on a second plurality of segments, where the second plurality of segments includes media asset summary segments that are associated with the media asset and are of one of the first importance and a second importance. The control circuitry may, upon determining that the length is not greater than the threshold value retrieve (e.g., from storage 404) summary segments of the first importance and second importance. In some embodiments, the control circuitry may retrieve the summary segments from a remote server (e.g., a server associated with media content source 516 and/or media guidance data source 518).

At 612, control circuitry 404, generates for display one of the first summary and the second summary based on whether the length is greater than the threshold length. For example, the control circuitry may retrieve (e.g., from storage 404) each summary segment and generate for display each summary segment in chronological order. In some embodiments, the control circuitry may retrieve each summary segment from a remote server (e.g., a server associated with media content source 516 and/or media guidance data source 518).

Figure 7:
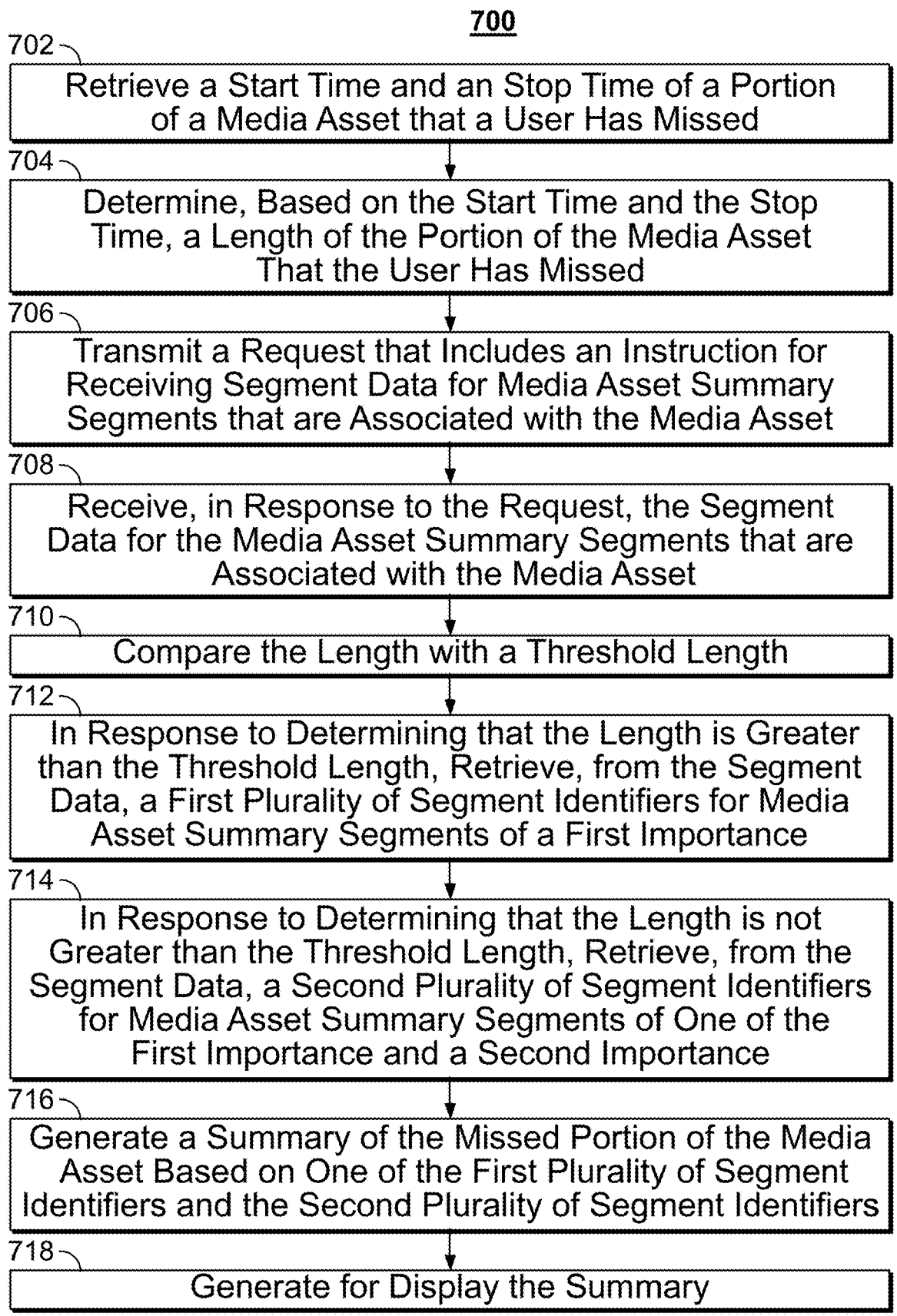
FIG. 7 is another flowchart of illustrative actions for generating summaries for missed portions of media assets in accordance with some embodiments of the disclosure.

FIG. 7 is another flowchart of illustrative actions for generating summaries for missed portions of media assets in accordance with some embodiments of the disclosure. At 702, control circuitry 404 retrieves a start time and a stop time of a portion of a media asset that a user has missed. The control circuitry may retrieve the start time and the stop time from storage 408. In some embodiments, the control circuitry may retrieve the start time and the stop time from a remote server (e.g., a server associated with media content source 516 and/or media guidance data source 518.

At 704, control circuitry 404 determines, based on the start time and the stop time, a length of the portion of the media asset that the user has missed. For example, the control circuitry may perform a time subtraction operation, subtracting the start time from the stop time.

At 706, control circuitry 404 transmits a request that includes an instruction for receiving segment data for media asset summary segments that are associated with the media asset. The control circuitry may transmit (e.g., via I/O path 402) a request to a remote server (e.g., a server associated with media content source 516 and/or media guidance data source 518). In some embodiments, the request may be a database query to a remote database server.

At 708, control circuitry 404 receives, in response to the request, the segment data for the media asset summary segments that are associated with the media asset. The control circuitry may receive (e.g., via I/O path 402) the segment data. The control circuitry may receive the segment data from a server associated with media content source 516 and/or media guidance data source 518).

At 710, control circuitry 404 compares the length with a threshold length. The control circuitry may retrieve the two values of memory and execute a comparison operation. If the two values are numeric, the control circuitry may execute a numeric comparison operation. If the two values are alpha-numeric, the control circuitry may perform a text comparison operation.

At 712, control circuitry 404, in response to determining that the length is greater than the threshold length, retrieves, from the segment data, a first plurality of segment identifiers for media asset summary segments of a first importance. The control circuitry may retrieve the segment identifiers from segment data stored in storage 408. In some embodiments, the control circuitry may retrieve the segment identifiers from segment data stored on a server (e.g., a server associated with media content source 516 and/or media guidance data source 518).

At 714, control circuitry 404, in response to determining that the length is not greater than the threshold length, retrieves, from the segment data, a second plurality of segment identifiers for media asset summary segments of one of the first importance and a second importance. The control circuitry may retrieve the segment identifiers from segment data stored in storage 408. In some embodiments, the control circuitry may retrieve the segment identifiers from segment data stored on a server (e.g., a server associated with media content source 516 and/or media guidance data source 518).

At 716, control circuitry 404 generates a summary of the missed portion of the media asset based on one of the first plurality of segment identifiers and the second plurality of segment identifiers. The control circuitry may generate the summary and store the summary in storage 408 and/or a remote server. At 718, control circuitry 404 generates for display the summary. The control circuitry may generate for display the summary on display 412.

Figure 8:
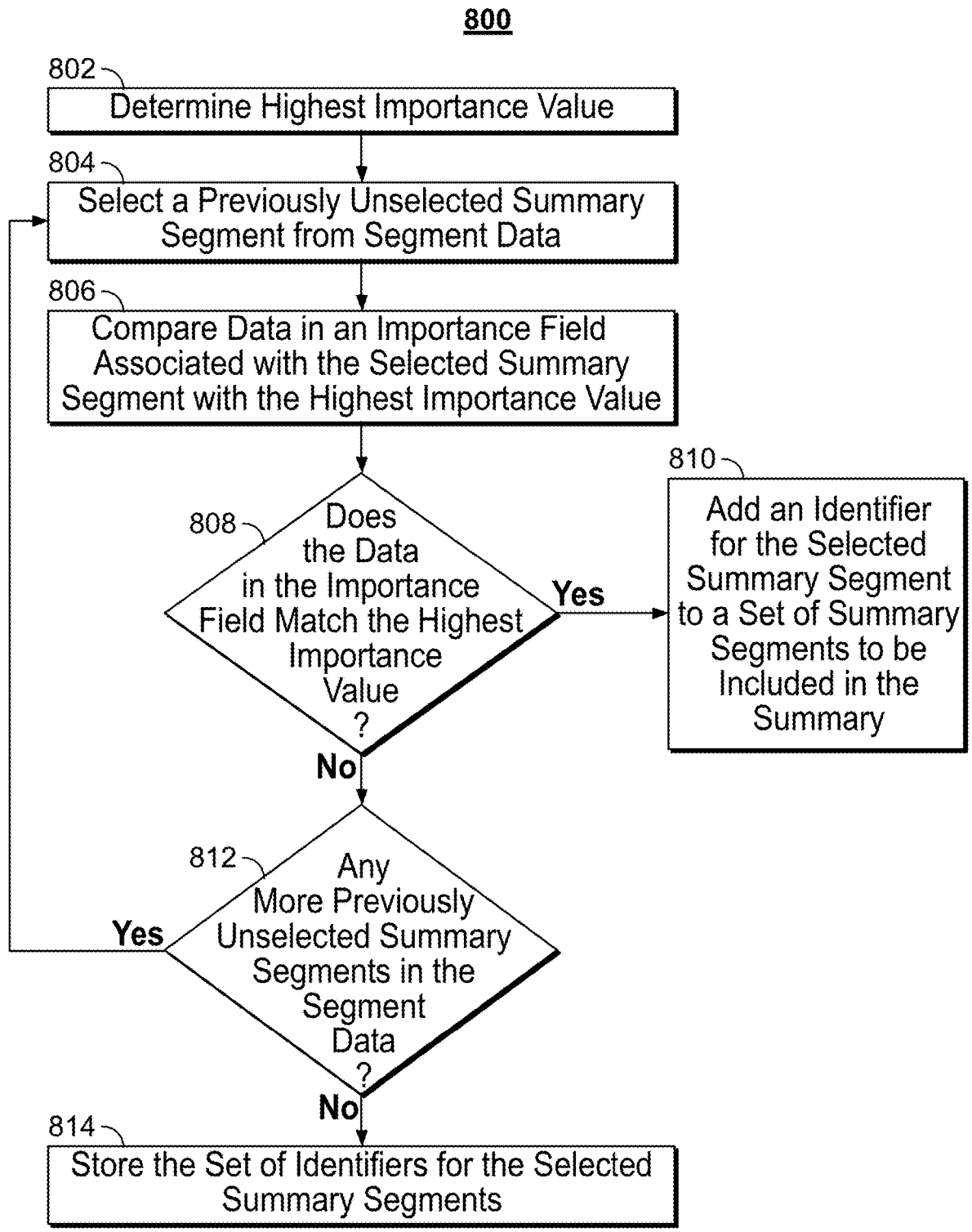
FIG. 8 is a flowchart of illustrative actions for storing a set of identifiers selected for inclusion in a summary, in accordance with some embodiments of the disclosure.

FIG. 8 is a flowchart of illustrative actions for storing a set of identifiers selected for inclusion in a summary, in accordance with some embodiments of the disclosure. At 802, control circuitry 404 determines a highest importance value. The control circuitry may determine the highest importance value by retrieving it from segment data located in storage 408 or at a remote server (e.g., a server associated with media content source 516 and/or media guidance data source 518).

At 804, control circuitry 404 selects a previously unselected summary segment from segment data. The control circuitry may iterate through the segment data and select for processing each segment (e.g., each segment's identifier). At 806, control circuitry 404 compares data in an importance field associated with the selected summary segment with the highest importance value. The control circuitry may retrieve for each segment within the segment data the importance field and retrieve from the importance field the value. The control circuitry may compare that value with the highest importance value. The control circuitry may retrieve or determine the highest importance value based on the information within the segment data or query a remote server for the information.

At 808, control circuitry 404 determines whether the data in the importance field matches the highest importance value. If the control circuitry determines that the data in the importance field matches the highest importance value, process 800 moves to action 810 where control circuitry 404 adds an identifier for the selected summary segment to a set of summary segments to be included in the summary. The control circuitry may generate data structure for the set and store the data structure in storage 408 and/or a remove server (e.g., a server associated with media content source 516 and/or media guidance dat source 518).

If the control circuitry determines that the data in the importance field does not match the highest importance value, process 800 moves to action 812. At 812, control circuitry 404 determines whether there are any more previously unselected summary segments in the segment data. If control circuitry 404 determines that there are more unselected summary segments, process 800 moves to action 804. If control circuitry 404 determines that there are no more unselected segments, process 800 moves to action 814. At 814, control circuitry 404 stores (e.g., in storage 408) the set of identifiers for the selected summary segments.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating a summary of a portion of a media asset, the method comprising:

determining a plurality of media asset summary segments within the portion of the media asset;

determining an importance value of the summary segments, wherein a higher importance value corresponds to a more important segment and a lower importance value corresponds to a less important segment;

determining the length of the portion of the media asset;

based on determining that the length of the portion of the media asset is greater than a threshold length, including higher importance value summary segments in the summary of the portion of the media asset; and based on determining that the length of the portion of the media asset is less than the threshold length, including higher and lower importance value summary segments in the summary of the portion of the media asset, wherein:

the summary segments with higher importance values are prioritized for inclusion over the summary segments with lower importance values, and when the length of the portion of the media asset is greater than the threshold length, the summary of the portion of the media asset is shorter than the summary of the portion of the media asset when the length of the portion of the media asset is less than the threshold length.

2. The method of claim 1, further comprising:

retrieving a start time and a stop time of the portion of the media asset; and determining, based on the start time and the stop time, the length of the portion of the media asset.

3. The method of claim 1, further comprising:

causing to be displayed the summary of the portion of the media asset based on the included summary segments.

4. The method of claim 3, further comprising generating the summary of the portion of the media asset based on the included summary segments by:

retrieving, for each summary segment, a link corresponding to a location of a segment;

retrieving, using the each respective link, the each segment associated with the included summary segments; and generating the summary by combining the retrieved segments in chronological order.

5. The method of claim 3, further comprising generating the summary of the portion of the media asset based on the included summary segments by:
retrieving, for each summary segments, one or more start times and stop times each pair of start time and stop time corresponding to a segment;
retrieving, from the media asset using the one or more start times and stop times, a plurality of segments for the summary; and
generating the summary by combining the plurality of segments in chronological order.

6. The method of claim 1, further comprising generating the summary of the portion of the media asset based on the included summary segments by:
retrieving, for each summary segment, one or more start times and stop times each pair of a start time and a stop time corresponding to a segment; and
storing both the portion of the media asset and the one or more start times and stop times.

7. The method of claim 6, further comprising:
retrieving the one or more start times and stop times in chronological order; and
playing segments of the portion of the media asset in accordance with the one or more start times and stop times.

8. The method of claim 1, wherein threshold length is determined based on the length of the media asset.

9. The method of claim 1, wherein the determining the plurality of media asset summary segments within the portion of the media asset further comprises:
transmitting a request that includes an instruction for receiving segment data for media asset summary segments that are associated with the portion of the media asset; and
receiving in response to the request, the segment data for the media asset summary segments that are associated with the portion of the media asset.

10. The method of claim 1, wherein the portion of the media asset is a missed portion of the media asset, the method further comprising:
monitoring user interactions to detect when a user switches from the media asset while consuming the media asset;
responsive to detecting the user switching from the media asset, storing a start time of the portion;
monitoring user interactions to detect when the user switches back to the media asset; and
responsive to detecting the user switching back to the media asset, storing a stop time of the portion.

11. A system for generating a summary of a portion of a media asset, the system comprising:
control circuitry configured to:
determine a plurality of media asset summary segments within the portion of the media asset;
determine an importance value of the summary segments, wherein a higher importance value corresponds to a more important segment and a lower importance value corresponds to a less important segment;
determine the length of the portion of the media asset;
based on determining that the length of the portion of the media asset is greater than a threshold length, include higher importance value summary segments in the summary of the portion of the media asset; and
based on determining that the length of the portion of the media asset is less than the threshold length, include higher and lower importance value summary segments in the summary of the portion of the media asset,
wherein:
the summary segments with higher importance values are prioritized for inclusion over the summary segments with lower importance values, and
when the length of the portion of the media asset is greater than the threshold length, the summary of the portion of the media asset is shorter than the summary of the portion of the media asset when the length of the portion of the media asset is less than the threshold length.

12. The system of claim 11, wherein the control circuitry is further configured to:
retrieve a start time and a stop time of the portion of the media asset; and
determine, based on the start time and the stop time, the length of the portion of the media asset.

13. The system of claim 11, wherein the control circuitry is further configured to:
cause to be displayed the summary of the portion of the media asset based on the included summary segments.

14. The system of claim 13, wherein the control circuitry is further configured to generate the summary of the portion of the media asset based on the included summary segments by:
retrieving, for each summary segment, a link corresponding to a location of a segment;
retrieving, using the each respective link, the each segment associated with the included summary segments; and
generating the summary by combining the retrieved segments in chronological order.

15. The system of claim 13, wherein the control circuitry is further configured to generate the summary of the portion of the media asset based on the included summary segments by:
retrieving, for each summary segments, one or more start times and stop times each pair of start time and stop time corresponding to a segment;
retrieving, from the media asset using the one or more start times and stop times, a plurality of segments for the summary; and
generating the summary by combining the plurality of segments in chronological order.

16. The system of claim 11, wherein the control circuitry is further configured to generate the summary of the portion of the media asset based on the included summary segments by:
retrieving, for each summary segment, one or more start times and stop times each pair of a start time and a stop time corresponding to a segment; and
storing both the portion of the media asset and the one or more start times and stop times.

17. The system of claim 16, wherein the control circuitry is further configured to:
retrieve the one or more start times and stop times in chronological order; and
play segments of the portion of the media asset in accordance with the one or more start times and stop times.

18. The system of claim 11, wherein threshold length is determined based on the length of the media asset.

19. The system of claim 11, wherein the control circuitry is further configured to determine the plurality of media asset summary segments within the portion of the media asset by:

transmitting a request that includes an instruction for receiving segment data for media asset summary segments that are associated with the portion of the media asset; and receiving in response to the request, the segment data for the media asset summary segments that are associated with the portion of the media asset.

20. The system of claim 11, wherein the portion of the media asset is a missed portion of the media asset, and wherein the control circuitry is further configured to:

monitor user interactions to detect when a user switches from the media asset while consuming the media asset;

responsive to detecting the user switching from the media asset, store a start time of the portion;

monitor user interactions to detect when the user switches back to the media asset; and responsive to detecting the user switching back to the media asset, store a stop time of the portion.

* * * * *